Patented Dec. 5, 1922.

1,438,042

UNITED STATES PATENT OFFICE.

WILBERT F. KINCAID, OF GAULEY BRIDGE, WEST VIRGINIA, ASSIGNOR OF ONE-HALF TO ALBERT H. MASON, OF GAULEY BRIDGE, WEST VIRGINIA.

STEERING GEAR FOR AUTOMOBILES.

Original application filed September 3, 1920, Serial No. 407,919. Divided and this application filed June 24, 1921. Serial No. 480,171.

*To all whom it may concern:*

Be it known that I, WILBERT F. KINCAID, a citizen of the United States, residing at Gauley Bridge, in the county of Fayette and State of West Virginia, have invented certain new and useful Improvements in Steering Gears for Automobiles, of which the following is a specification.

This invention relates to means for steering automobiles, the present application being a division of an application filed by me September 3, 1920, Serial No. 407,919. The object of this invention is to provide a steering mechanism which will hold the ground wheels in parallelism with the body or vehicle or set them at an angle to the body without laborious effort by the chauffeur, and a particular object of the invention is to provide means whereby normally the amplitude of movement of the steering devices will be definitely limited but it may be extended to permit the vehicle to make a sharp turn. The invention is illustrated in the accompanying drawing and will be hereinafter fully set forth.

In the drawings—

Fig. 4 is a detail.

Figure 1:
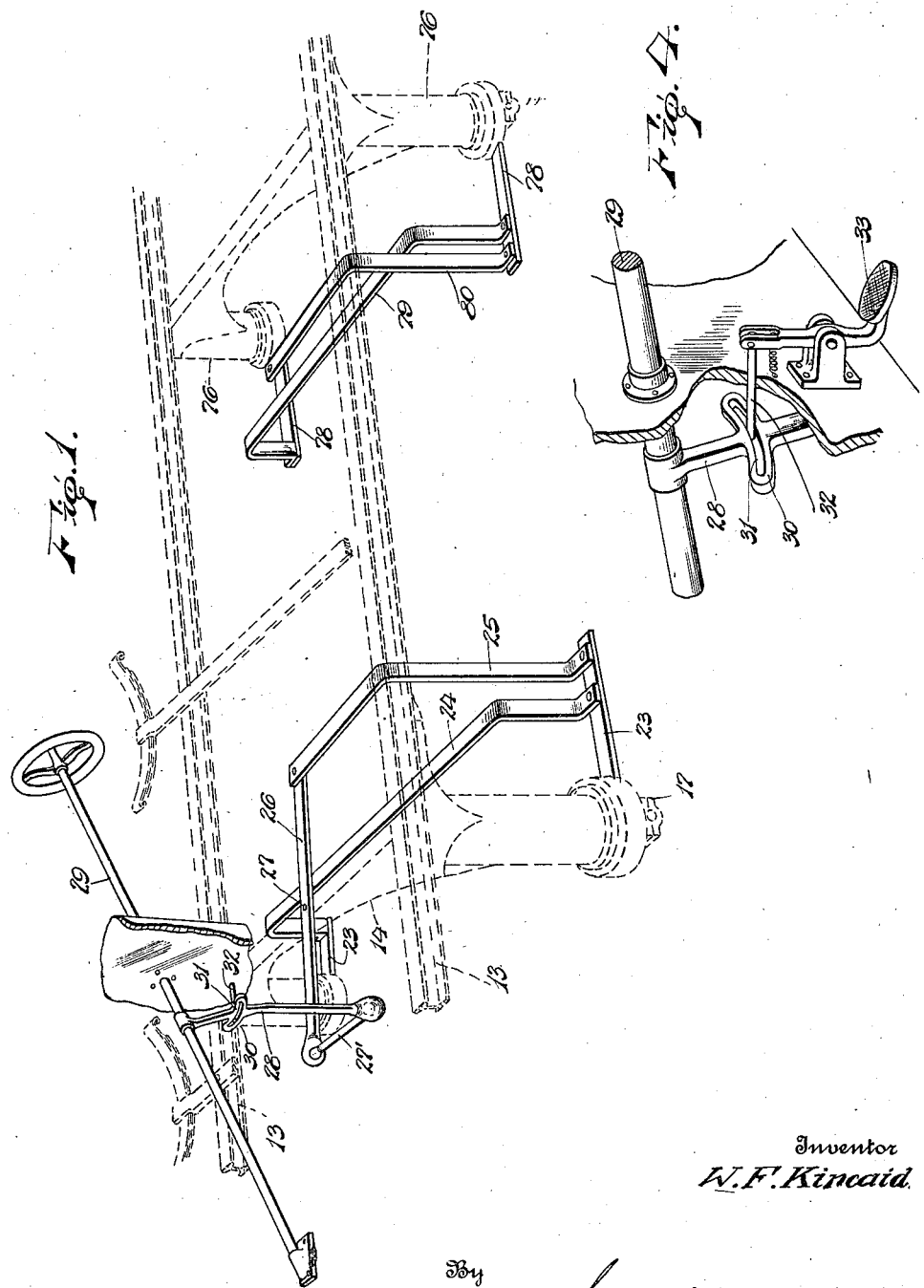
Figure 1 is a perspective view of a part of the automobile operating mechanism embodying my invention.
Figure 2:
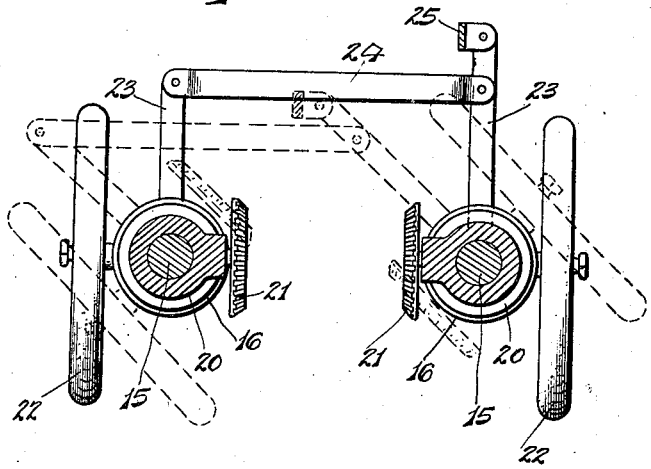
Fig. 2 is a view partly in plan and partly in horizontal section.
Figure 3:
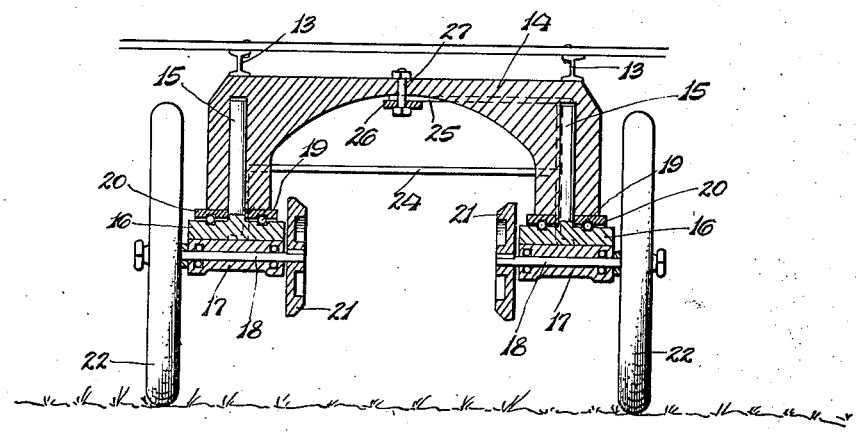
Fig. 3 is a transverse section.

Near the front end of the chassis and secured to the sills 13 thereof is an arched axle support 14 in the columns of which are sockets receiving spindles 15 provided at their lower ends with heads 16 to the under side of which the bearings 17 for the front axles 18 are secured. Antifriction balls 19 are fitted in a suitable raceway formed in the lower end of each column and run upon a washer 20 interposed between the upper side of the head 16 and the lower end of the column, as clearly shown in Fig. 3, so that the spindle with its head and the axle carried thereby may be easily turned in a horizontal plane. Each axle 18 is equipped at its inner end with a gear 21 through which motion may be imparted to the axles from the vehicle motor and intermediate motion-transmitting elements, and at its outer end carries the ground wheel 22 so that when power is applied to the gears 21 the wheels will be rotated. Secured to the head 16, in rear of the axle, is a crank or swinging arm 23, the two arms being connected by a brace 24 extending transversely of the machine and having its ends pivoted to the respective cranks so that the cranks will always be in parallelism and movement of one will be transmitted directly to the other. One of the cranks is extended beyond the end of the connecting brace 24 and is pivoted at its extremity to the lower end of a connecting bar 25 which rises from the crank to a point adjacent the sills 13 and is then extended transversely of the machine to be secured to the rear end of a vibratory arm or lever 26 fulcrumed between its ends upon the arch 14, as shown at 27, and having its front end connected by a link 27' with a crank 28 secured to and depending from the front end of the steering rod 29. The said crank is provided between its ends with a cross head 30 having an arcuate slot 31 therein whereby to accommodate the stop pin 32 extending from the treadle 33 mounted on the vehicle dash, the said pin 32 limiting the movement of the crank 28 by engaging the ends of the slot 31 in an obvious manner. It will now be readily seen that the manipulation of the steering rod 29 in the usual manner will swing the crank 28 so as to oscillate the arm or lever 26 and thereby shift the connecting rod 25 transversely of the machine in order to swing the cranks 23 in a horizontal plane and thereby rotate the heads 16 and the spindles 15 so that the axles 18 and the wheels 22 carried thereby will be disposed in angular relation to the automobile and the same caused to follow the desired path. Normally, the pin 32 permits sufficient movement of the ground wheels for steering purposes but prevents the wheels being moved to the extreme position shown in dotted lines in Fig. 2. When greater movement is desired, the treadle 33 is manipulated to withdraw the pin 32 from the slot 30 whereupon the arm 28 may describe an arc of greater magnitude.

When the machine is going straight ahead, the front steering wheels may be utilized also as driving wheels but when it is desired to depart from a rectilinear path the powertransmitting elements are shifted to permit the pivotal turning of the spindles 15 to steer the vehicle.

The rear wheels are carried by spindles corresponding in all respects to the spindles 15 which carry the front wheels and are rotatably fitted in columns 76 forming parts of a rear transverse arch. The heads of the rear spindles are provided with cranks 78 connected by a cross bar or brace 79 and the said cranks 78 are swung in a horizontal plane by mechanism which includes a transversely disposed arm or bar 80 corresponding in all respects to the bar 25 at the front end of the machine. The inner end of the said bar 80 is connected with operating devices (not shown) controlled by a hand lever at the front end of the vehicle. It will be readily understood that, when the said hand lever is manipulated, the motion thereof will be transmitted through the described parts to the spindles and the driving wheels set parallel with the sides of the vehicle body or disposed in angular relation thereto according to the direction in which the hand lever is shifted.

In ordinary driving, the steering is accomplished solely by the shifting of the front wheels and the rear wheels are held parallel to the sides of the vehicle body. It frequently happens, however, especially when the vehicle is being brought into position in a crowded garage or in a small space, that a sufficiently short turn cannot be made with the vehicle as ordinarily constructed but by mounting the rear wheels as shown and described, such short turns can be made and the vehicle quickly brought into the desired position. The complete automobile, for which the present invention is primarily intended, embodies mechanism whereby driving power may be applied to the wheels when they are disposed obliquely as well as when they are parallel with the body.

Having thus described the invention, what is claimed as new is:

In an automobile, the combination of vertically disposed spindles rotatably mounted in the frame, axles carried by the lower ends of said spindles, ground wheels on the outer ends of said axles, cranks extending in parallelism from said spindles, a connection between said cranks, a transversely disposed actuating arm secured to one of said cranks, a horizontally oscillating lever connected at its rear end to the inner end of said arm, a steering rod, a crank depending from the lower forward end of the steering rod in front of the automobile dash, a link connecting the lower end of the crank with the front end of said oscillatory lever, said crank being provided with a slotted cross head, a stop-pin slidably fitted through the dash and normally engaging said slotted crosshead, and means on the the dash to withdraw the stop pin from the crosshead at will.

In testimony whereof I affix my signature.

WILBERT F. KINCAID. [L. S.]